United States Patent [19]
Schulze et al.

[11] Patent Number: 5,675,203
[45] Date of Patent: Oct. 7, 1997

[54] MOTOR/GENERATOR ARRANGEMENT HAVING A MOVABLE COMMON STATOR

[75] Inventors: Bernd-Guido Schulze, Wolfsburg; Adam Dittner, Höchstadt, both of Germany

[73] Assignee: Volkswagen AG, Wolfsburg, Germany

[21] Appl. No.: 387,028

[22] Filed: Feb. 10, 1995

[30] Foreign Application Priority Data

Mar. 15, 1994 [DE] Germany .................. 44 08 719.5

[51] Int. Cl.$^6$ .................. H02K 16/02; H02K 47/20; H02K 49/10
[52] U.S. Cl. .................. 310/113; 310/103; 310/114
[58] Field of Search .................. 310/103, 105, 310/109, 112, 113, 114, 182, 197

[56] References Cited

U.S. PATENT DOCUMENTS

| | | | |
|---|---|---|---|
| 1,171,351 | 2/1916 | Neuland | 310/103 |
| 1,246,643 | 11/1917 | Neuland | 310/109 |
| 2,471,947 | 5/1949 | Giannini | 310/103 |
| 2,790,917 | 4/1957 | Trofimov | 310/102 |
| 3,046,471 | 7/1962 | Williams | 310/112 |
| 3,523,204 | 8/1970 | Rand | 310/94 |
| 4,532,447 | 7/1985 | Cibié | 310/114 |
| 5,495,131 | 2/1996 | Goldie et al. | 310/112 |

FOREIGN PATENT DOCUMENTS

| | | |
|---|---|---|
| 3041867 | of 0000 | Germany . |
| 457972 | of 0000 | United Kingdom . |

*Primary Examiner*—Clayton E. LaBalle
*Attorney, Agent, or Firm*—Brumbaugh, Graves, Donohue & Raymond

[57] ABSTRACT

In the electric motor/generator arrangement described in the specification, a hollow cylindrical generator rotor is mounted on an input shaft connected to an internal combustion engine and a hollow cylindrical electric motor rotor is connected to an output shaft. Both rotors have circumferential rings of permanent magnets of alternately opposite polarity, and the rings are disposed in axially-spaced relation. A stator has at least one switchable short-circuit winding arranged so as to be displaceable by a displacement device over a wide range adjacent to the permanent magnets of the rotors. Magnetic field sensors disposed between the permanent magnets in each ring detect the polarity of adjacent permanent magnets in the other ring, and the short-circuit winding is closed or opened as a function of the sensor signals. In this way, the direction of rotation of the output shaft can be changed and the rotational speed and the output torque of the output shaft can be varied according to the position of the short-circuit winding with respect to the permanent magnets of the motor rotor and the generator rotor.

10 Claims, 4 Drawing Sheets

MOTOR/GENERATOR ARRANGEMENT HAVING A MOVABLE COMMON STATOR

BACKGROUND OF THE INVENTION

This invention relates to motor/generator arrangements having a common stator.

German Offenlegungsschrift No. 30 41 867 discloses a motor vehicle drive arrangement in which an internal combustion engine drives an electric device which can be used optionally in a motor mode or a generator mode. On the output side of this electric device is a mechanical transmission which can be either manual or automatic. This transmission in turn drives a differential gear connected to drive axles for the driven wheels of the motor vehicle.

Another motor/generator combination is disclosed in U.S. Pat. No. 2,790,917, in which a common stator surrounds both a motor rotor and a generator rotor which is axially adjacent to the motor rotor.

Furthermore, British Patent No. 457,972 describes a motor/generator combination having two direct-current machines and a common exciter winding which surrounds both machine rotors and is arranged so as to be displaceable coaxially with respect to the rotors by an adjustment device for setting the transmission ratio.

U.S. Pat. No. 4,532,447 discloses a motor/generator combination having three concentric active components which are arranged in succession radially. The central component is provided with windings which are switched on and off by magnetic field sensors according to the cycle of the alternating magnetic fields.

Furthermore, it is known that, when using infinitely variable transmissions, the torque and power characteristics of an internal combustion engine can be matched as desired to the operating load over a wide range. Therefore, such arrangements are preferred to mechanical or automatic multi-step transmissions for use as power transmissions in a motor vehicle. Disadvantages of conventional multi-step transmissions are an excessively low spread factor and, in particular, a relatively poor efficiency. Additionally, in order to accommodate an electric motor/generator arrangement, the overall length of the drive assembly is increased, which occasionally leads to space problems, particularly in vehicles having a front transverse drive assembly.

SUMMARY OF THE INVENTION

Accordingly, it is an object of the present invention to provide an electric motor/generator arrangement which overcomes the disadvantages of the prior art.

Another object of the invention is to provide an electric motor/generator arrangement for a vehicle in which the overall length of the vehicle drive assembly is significantly reduced.

These and other objects of the invention are attained by providing a motor/generator arrangement having hollow motor and generator rotors, each supporting a ring of permanent magnets having alternating polarity in the circumferential direction and an axially-displaceable stator disposed adjacent to the rings of permanent magnets on the motor and generator rotors and having a short-circuit winding which is switched as a function of the position of the permanent magnets on the two rotors with respect to each other.

The invention is based on the discovery that, where a motor and generator are combined in one housing with a single stator which is axially displaceable with respect to the generator and motor rotors provided with permanent magnets with alternating polarity in which the stator is provided with one or more short-circuit windings, an electric transmission with infinitely variable control is provided. In this arrangement, both the generator rotor and the rotor of the electric motor interact with the same winding of the stator. Consequently, the same electric current flows in both the generator component and in the motor component of the winding.

By providing a stator with a short-circuit winding which is axially displaceable, the effective length of the winding conductor in the generator component and in the motor component can be varied. This variation of the winding conductor length in the magnetic fields of the generator rotor and motor rotor makes possible both open-loop and closed-loop controllability of the rotational speed and torque transmission ratio of the generator/electric motor combination according to the invention, providing an electric transmission with infinitely variable control. Thus, any desired torque transmission ratio (i.e., spread) of the transmission can be set within a wide range by displacing the stator.

The pulsating torque which is typically generated with this type of electric machine can be smoothed out by providing a plurality of submotors mounted on the rotors. For this purpose, a plurality of conductor windings are arranged in offset relation on the stator so that the torque ripple is minimized.

In one embodiment of the invention, the stator of the direct-current motor/generator has its short-circuit winding mounted on a sliding sleeve which can be displaced axially by a rod which projects through an opening in the housing. For this purpose, the stator includes a hollow cylindrical sliding sleeve which can be displaced coaxially with respect to the axis of rotation of the input shafts and output shafts of the motor/generator combination on a hollow cylindrical stator carrier supported by the housing.

In accordance with another aspect of the invention, the generator rotor surrounds the motor rotor in such a way that the permanent magnets of the rotor are axially spaced from the permanent magnets of the generator rotor in the direction of the output shaft. In this way, particularly advantageous space-saving design is achieved. Additionally, this makes it possible for the permanent magnets of both of the motor and generator rotors to be positioned at the same distance from the stator winding.

In a typical embodiment, the input shaft of the motor/generator, which is connected to a drive source such as an internal combustion engine, is supported from the housing by only one bearing. In order to support the output shaft, the input shaft extends deep into the housing and carries two bearings on which the output rotor is supported, that rotor also being mounted on the output shaft which is additionally supported from the housing by a further bearing.

Preferably, the structure of the motor/generator arrangement includes at least two magnetic field sensors arranged between the permanent magnets of the motor and generator rotors. Using these magnetic field sensors in each rotor, the polarity of the adjacent permanent magnet in the other rotor can be determined during rotation of the rotor. In response to the signals from the magnetic field sensors determined in this way, the short-circuit winding of the stator can be switched, and thus the direction of rotation of the rotor which is connected to the output shaft can be controlled. Consequently, the direct-current motor/generator according to the invention can be used as an electromagnetic torque transducer or electromagnetic transmission having a gear ratio which changes when the stator winding is displaced. The use of a motor/generator arrangement of this kind is particularly beneficial in motor vehicles having a so-called hybrid drive.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENT

Figure 1:
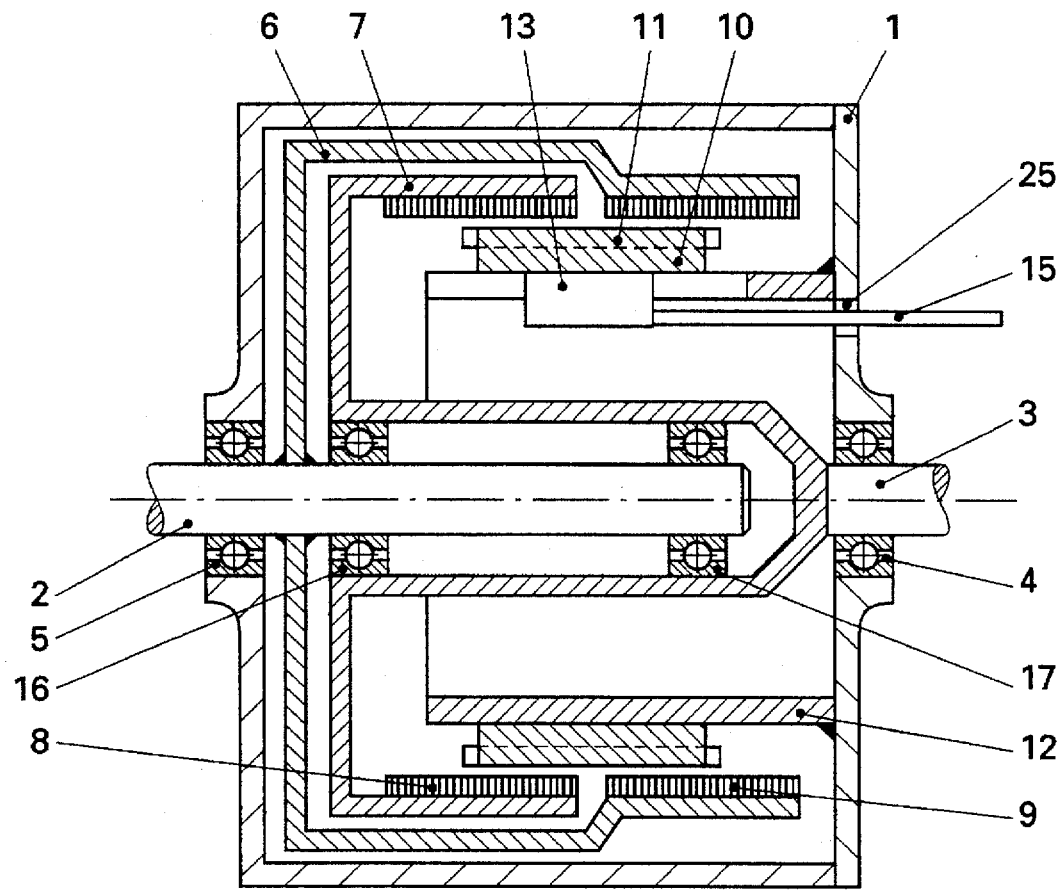
FIG. 1 is a schematic view in axial section illustrating a representative embodiment of a motor/generator arrangement according to the invention.

In the typical embodiment of the invention shown in FIG. 1, a motor/generator arrangement is shown diagrammatically. In this arrangement, an input shaft 2, which is connected to a drive source such as an internal combustion engine (not shown), extends into one side of a housing 1. The input shaft 2 is supported in the housing 1 by a bearing 5 and carries a generator rotor 6. The generator rotor has a hollow cylindrical shape open at one end and carries a ring of inwardly-directed permanent magnets 9 of alternately opposite polarity at its open end.

An output shaft 3 extends from the housing 1 at the side opposite the bearing 5. The output shaft 3 is supported in the housing 1 by a bearing 4 and is connected inside the housing to an electric motor rotor 7 which has a hollow cylindrical shape open at one end. The motor rotor 7 is supported by two spaced bearings 16 and 17 on the input shaft 2, which extends a substantial distance inside the rotor toward the opposite side of the housing. Like the generator rotor 6, the hollow motor rotor 7 also carries a ring of inwardly-directed permanent magnets 8 of alternately opposite polarity at its open end.

In order to minimize the axial dimension of the motor/generator arrangement, the generator rotor 6 surrounds the motor rotor 7 so that the ring of permanent magnets 8 of the motor rotor 7 is axially spaced from, but aligned with, the ring of permanent magnets 9 of the rotor 6, the magnets 8 of the motor rotor 7 being farther from the output shaft 3 than the magnets 9 of the generator rotor 6.

A stator support 12, which has a hollow cylindrical shape and surrounds the input and output shafts 2 and 3, extends from the inside wall of the housing 1 containing the output shaft bearing 4 into the hollow cylindrical space within the generator and motor rotors 6 and 7. A sliding sleeve 13, which carries the stator 10 of the motor/generator, is mounted on the stator support 12.

The stator 10 incorporates at least one switchable short-circuit winding 11, which is magnetically coupled to the permanent magnets 8 and 9 of the generator and motor rotors 6 and 7, respectively.

A rod 15, projecting through an opening 25 in the housing 1, is coupled to the stator 10 so as to displace it, together with its sliding support sleeve 13, coaxially with respect to the input and output shafts 2 and 3.

This axial displaceability of the winding 11 in the stator 10 permits variation of the effective lengths of the conductor in the winding within the generator rotor and within the motor rotor, respectively, which permits controllability of the rotational speed and torque transmission ratio of the direct-current motor/generator arrangement according to the invention.

Figure 2:
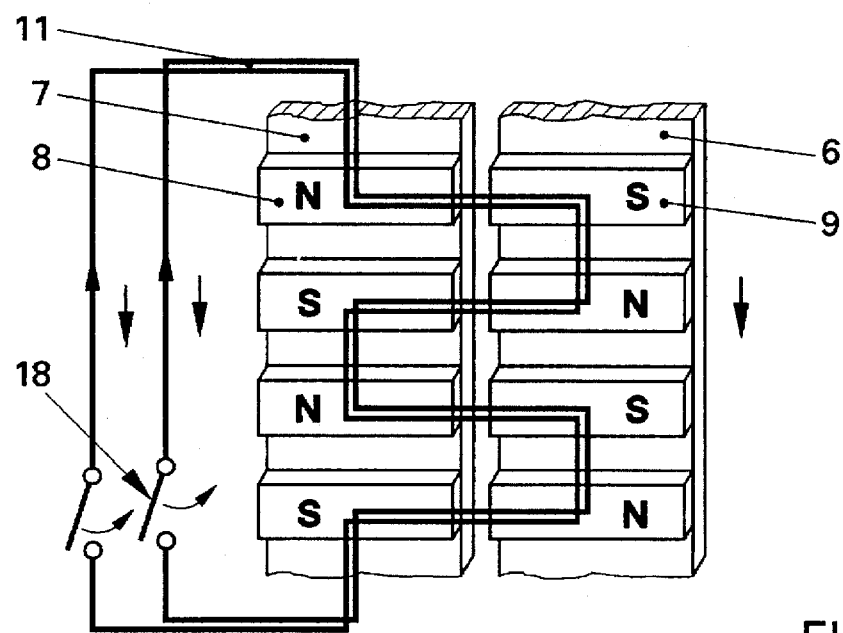
FIG. 2 is a schematic fragmentary perspective view showing the overlap of the stator winding with the permanent magnets of the motor and generator rotors in the arrangement shown in FIG. 1.

In FIG. 2, the arrangement of the permanent magnets 8 and 9 on the generator and motor rotors 6 and 7 is illustrated diagrammatically, with the stator position corresponding to that shown in FIG. 1. The arrows show the direction of rotation of the rotors with respect to the short-circuit winding 11, which is only partially illustrated. The switch 18 in the short-circuit winding 11 represents an arrangement for short-circuiting the winding, for example, using bipolar transistors.

If the rotor 6 and its ring of generator magnets 9 is driven by the internal combustion engine with the stator winding 11 short-circuited, represented by the closed switch 18, a voltage is induced in the winding 11 by the motion of the permanent magnets 9, producing a flow of current in this winding. If there are adjacent permanent magnets of opposite polarity on the rotors 6 and 7, this current produces a force which acts on the motor rotor 7 to move it in the same direction as the rotational motion of the generator rotor 6. On the other hand, if magnetic poles of the same polarity are located opposite one another on the rotors 6 and 7, the force produced by the stator current acts in the opposite direction.

If the stator winding is permanently short-circuited while the generator rotor operates, a force with a constantly changing polarity acts on the motor rotor. Therefore, even when the output side is not under load, no rotational movement is produced. Depending on which direction of motion is desired at the output side, that is to say, at the motor rotor 7, there is, therefore, always a "correct" and an "incorrect" position of the two permanent magnet sets 8 and 9 with respect to one another.

An important feature of the invention is, therefore, to permit the current flow for the "correct" position of the magnets by closing the switch 18 represented in FIG. 2 and to prevent current flow by opening the switch 18 for the "incorrect" position of the permanent magnets. If this functional principle is maintained consistently, a pulsating torque is generated at the output side of the motor/generator which can be utilized as a vehicle drive force. The pulse frequency corresponds to the periods of activation and deactivation of the winding. The maximum frequency occurs, theoretically, when the output side is stationary and the drive side is at its maximum rotational speed. The maximum rotational speed of a conventional gasoline engine is 6,000 rpm, corresponding to 100 Hz, and, in a 28-pole machine, this produces a frequency of approximately 1.4 kHz. Modern semiconductor elements when used as the switch 18 are perfectly capable of operating at such rates.

When the output shaft 3 is under load, a current will be produced in the winding 11 which has an effective value proportional to the output-side load torque. If the effective conductor length of the winding 11 is the same in the generator component and in the motor component, as represented in FIGS. 1 and 2, an output shaft speed will be produced when the output side is not under load which is equal to the input shaft speed. The current for this theoretical limiting case is zero. When the output shaft is under load, the rotational speed drops in accordance with the magnitude of the load. In other words, the output side has the characteristic of a direct-current shunt motor or an externally-excited direct-current motor. In this position, the transmissible torque at both rotors is the same, which corresponds to a gearbox transmission ratio of 1:1.

Figure 3:
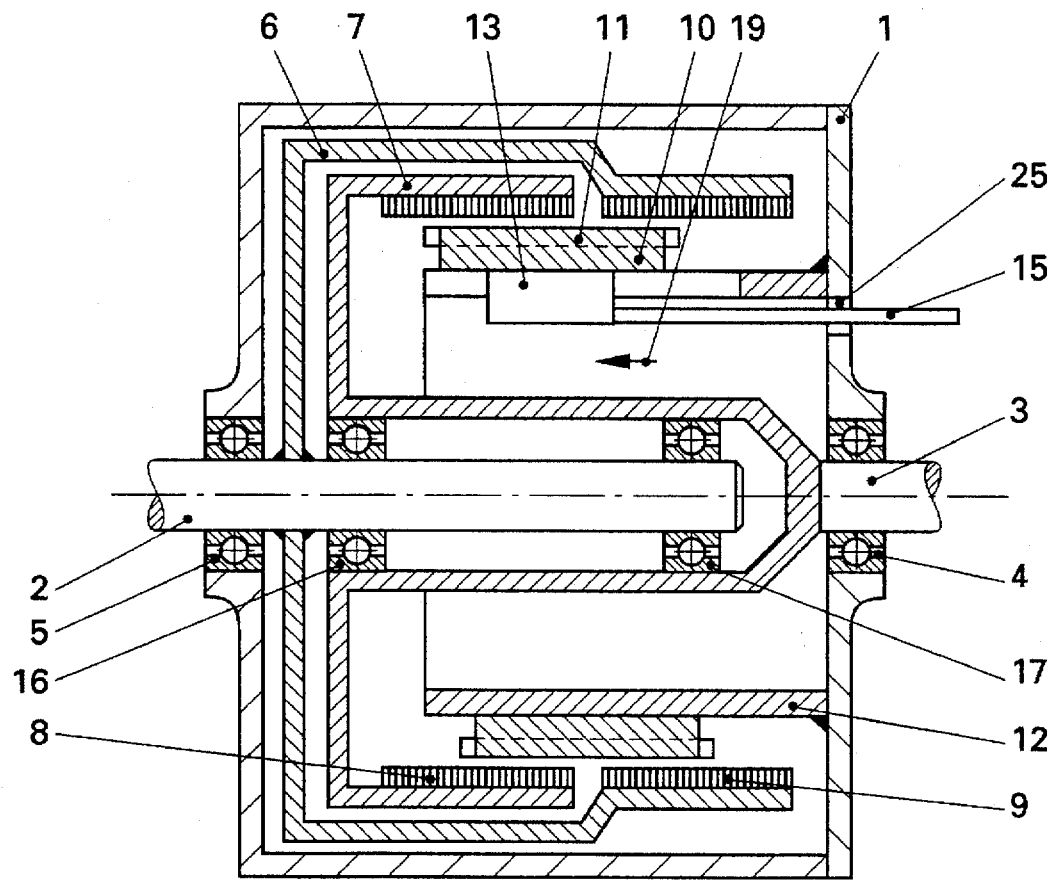
FIG. 3 is a view of the motor/generator arrangement of FIG. 1 in which the stator has been displaced in the direction toward the input shaft.
Figure 4:
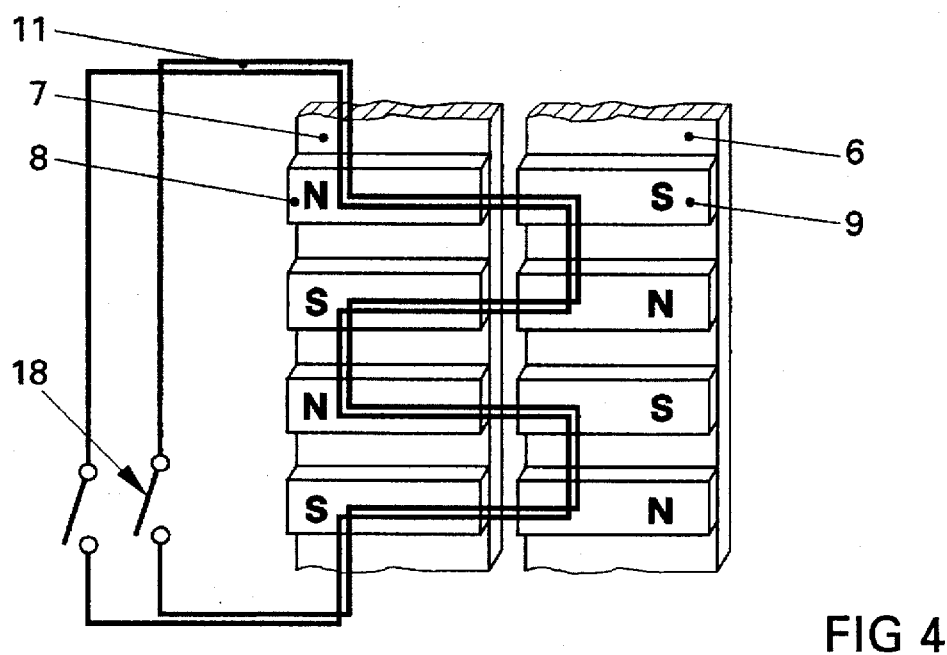
FIG. 4 is a view similar to FIG. 2 showing the position of the stator winding in the condition shown in FIG. 3.

In FIG. 3, the motor/generator combination according to the invention is illustrated with the slidable stator 10 displaced in the direction toward the permanent magnets 8 of the motor rotor 7, the displacement direction for the rod 15 being designated by the arrow 19. In this position, the short-circuit winding 11, as schematically represented in FIG. 4, has considerably more of its effective conductor length in the region of the permanent magnets 8 of the motor rotor 7 than in the region of the permanent magnets 9 of the generator rotor 6, so that the output shaft torque increases and the output speed decreases.

Figure 5:
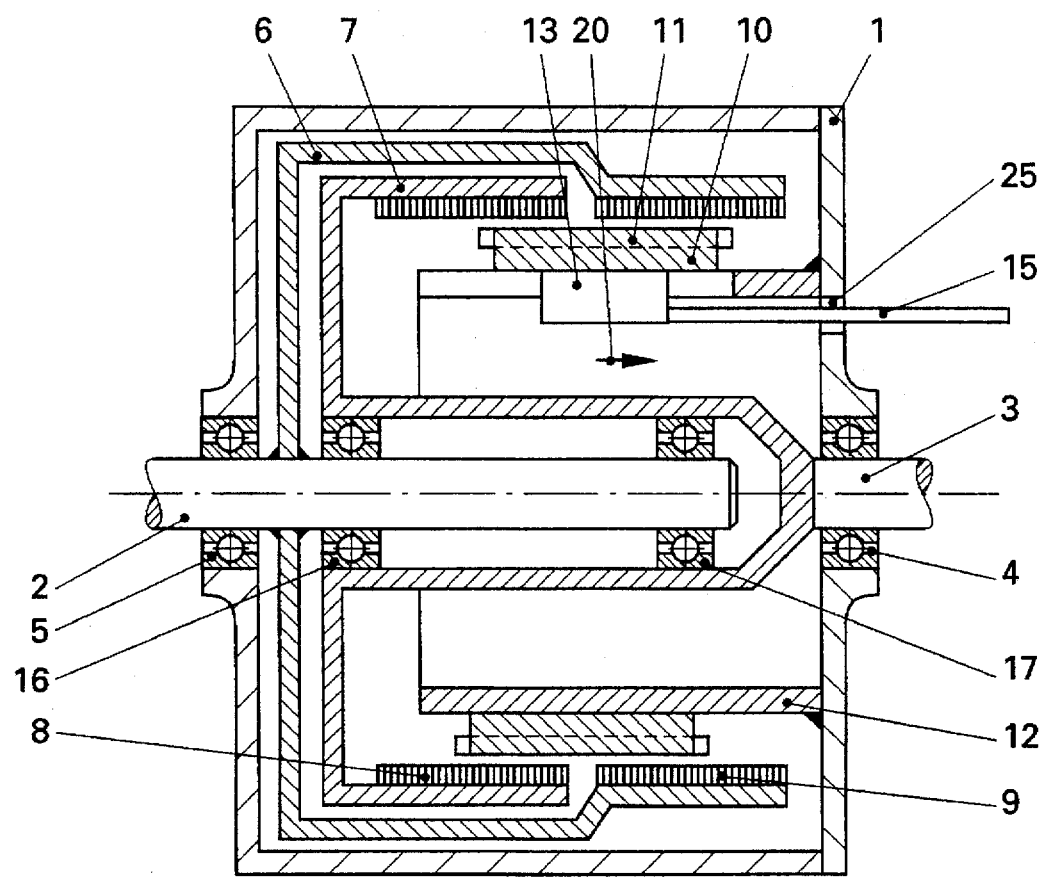
FIG. 5 is a view of the motor/generator arrangement of FIG. 1 in which the stator has been displaced in the direction toward the output shaft.
Figure 6:
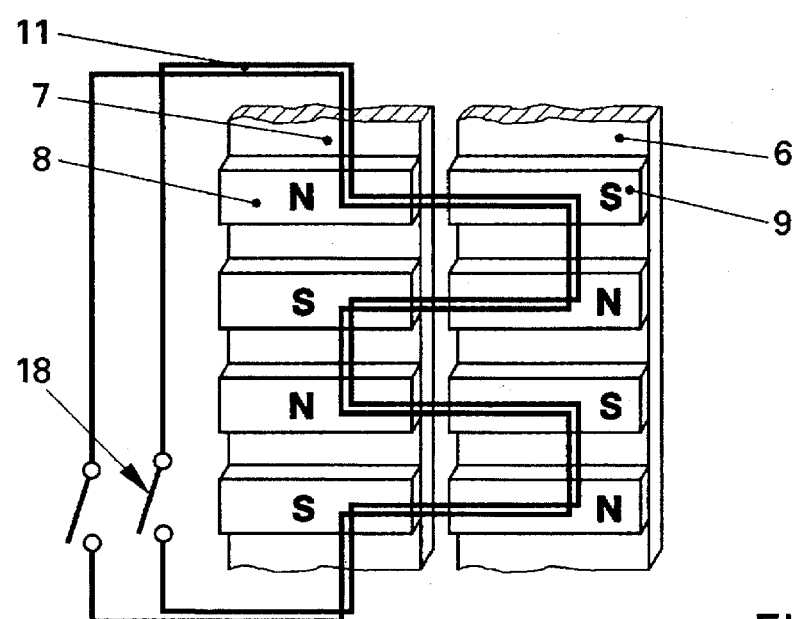
FIG. 6 is a view similar to FIG. 2 showing the position of the stator winding in the condition shown in FIG. 5.

When the short-circuit winding 11 is displaced in the opposite direction, as shown by the arrow 20 in FIGS. 5 and 6, the opposite effect occurs, i.e., the output speed at the output shaft 3 increases while the output torque decreases.

With the short-circuit winding 11 displaced with the stator 10 in the direction of the permanent magnets 9 of the generator rotor 6, the effective conductor length of the winding within the driving component becomes larger and, in contrast, that within the output component becomes smaller. Since the effective value of the winding current is, in a first approximation, only dependent on the load torque, it can be considered initially as being constant. This reduction of the conductor length in the output component causes the output torque to decrease. In contrast, the driving torque in the generator component increases. Since the input power must be the same as the output power, disregarding losses, the result is an increase in the rotational speed on the output side and a decrease in the rotational speed on the drive side.

It is therefore apparent that, as a result of axial displacement of the stator, it is possible to provide an electric transmission having a very large, continuously variable spread. Thus, the electric motor/generator arrangement of the invention can be used to replace a conventional transmission such as a planetary gear transmission having a torque converter in the drive structure, as previously described. Additionally, with appropriate displacement of the stator to the motor rotor end or the generator rotor end of its range of motion, the direct-current motor/generator arrangement according to the invention can also be used as a starter or a generator for a motor vehicle.

Figure 7:
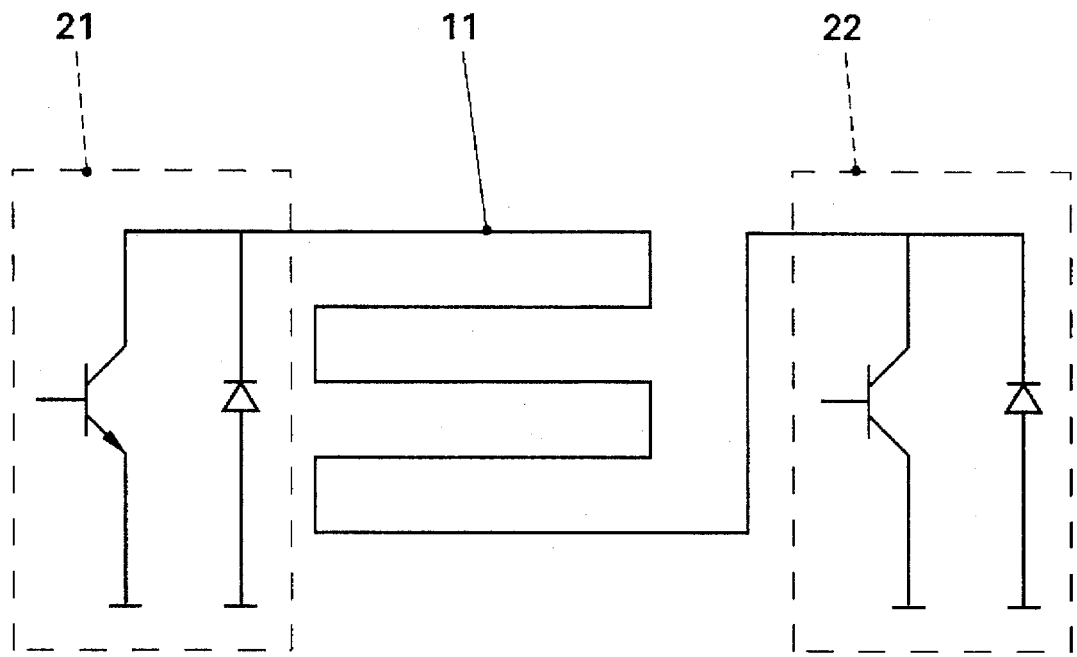
FIG. 7 is a schematic circuit diagram showing a typical circuit breaker for actuating the stator winding in the embodiment of FIG. 1.

As previously described and represented in the drawings by the switch 18, the stator winding must be switched on and off as a function of the position of the individual poles of the permanent magnets 8 and 9 with respect to one another. As illustrated in FIG. 7, semiconductor switches, for example, inexpensive switching transistors 21 and 22, can be used advantageously as circuit breakers.

Figure 8:
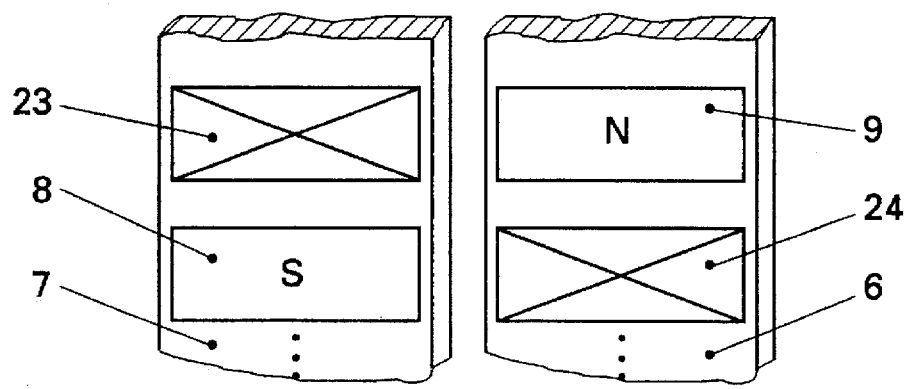
FIG. 8 is a schematic fragmentary perspective view showing the arrangement of the magnetic field sensors on the generator and motor rotors.

As described above and illustrated in FIG. 8, two magnetic field sensors 23 and 24 are arranged between adjacent permanent magnets 8 and 9 on the generator and motor rotors 6 and 7, respectively, to actuate the switches 18. Each of these magnetic field sensors detects the polarity of the magnetic field of the permanent magnet located opposite it in the other rotor and thus permits the corresponding switch 18 to be actuated. By arranging the switch-on and switch-off times of the winding as a function of the position of the magnetic poles with respect to one another, it is possible to provide rotation of the electromagnetic torque converter in either direction, as desired. A rule which applies to this, in simplified form, is that the two rotors 6 and 7 rotate in the same direction if the sensors 23 and 24 sense different magnetic field polarities and the switch 18 is turned on, while the rotors 6 and 7 rotate in opposite directions if the sensors 23 and 24 sense the same magnetic field polarity and the switch 18 is turned on. Thus, it is possible, after evaluation of the information from the magnetic field sensors 23 and 24, to switch the short-circuit winding 11 of the stator 10 with the aid of the circuit breakers 21 and 22 to allow the direction of rotation of the output rotor 7 with respect to the input rotor 6 to be selected as desired.

Although the invention has been described herein with reference to a specific embodiment, many modifications and variations therein will readily occur to those skilled in the art. Accordingly, all such variations and modifications are included within the intended scope of the invention.

We claim:

1. An electric motor/generator arrangement comprising a housing, a hollow cylindrical generator rotor supported for rotation within the housing and connected to an input shaft, a hollow cylindrical motor rotor supported for rotation within the housing and connected to an output shaft, the rotors being coaxial with respect to each other, each rotor having a circumferential ring of permanent magnets of alternately opposite polarity, and an axially-displaceable stator having at least one short-circuit winding disposed adjacent to both rings of permanent magnets which is switched as a function of the position of the permanent magnets of the two rotors with respect to each other.

2. An electric motor/generator arrangement according to claim 1 including a hollow cylindrical stator carrier supported from the housing and wherein the stator is mounted on a sliding sleeve so as to be displaceable coaxially with respect to the axis of rotation of the input and output shafts and a rod extending through an opening in the housing to engage the sliding sleeve.

3. An electric motor/generator arrangement according to claim 1 wherein the generator rotor surrounds the motor rotor so that the permanent magnets of the motor rotor are farther from the output shaft than the permanent magnets of the generator rotor.

4. An electric motor/generator arrangement according to claim 1 wherein the permanent magnets of both rotors are spaced the same distance in the radial direction from the stator winding.

5. An electric motor/generator arrangement according to claim 1 including bearings on the input shaft for supporting the output shaft.

6. An electric motor/generator arrangement according to claim 1 including magnetic field sensors disposed between adjacent permanent magnets on each of the rotors.

7. An electric motor/generator arrangement according to claim 1 wherein the stator is provided with a plurality of separate short-circuit windings.

8. An electromagnetic torque converter comprising an input rotor having a circumferential ring of permanent magnets of alternately opposite polarity, an output rotor having a circumferential ring of permanent magnets of alternately opposite polarity arranged axially adjacent to the permanent magnets of the input rotor, and a stator having a short-circuit winding which is movable in the axial direction adjacent to the permanent magnets of both rotors to provide a continuously variable output torque.

9. A method for controlling an electromagnetic torque converter having an input rotor with a circumferential ring of permanent magnets of alternately opposite polarity, an output rotor having a circumferential ring of permanent magnets of alternately opposite polarity, and a stator having a short-circuit winding movable in the axial direction adjacent to the permanent magnets of both rotors comprising controlling the direction of rotation of the output rotor by switching the short-circuit winding as a function of the position of the permanent magnets of the two rotors with respect to each other.

10. A method for controlling an electromagnetic torque converter having an input rotor with a circumferential ring of permanent magnets of alternately opposite polarity, an output rotor having a circumferential ring of permanent magnets of alternately opposite polarity, and a stator having a short-circuit winding movable in the axial direction adjacent to the permanent magnets of both rotors comprising controlling the rotational speed and the output torque of the output rotor by moving the stator short-circuit winding in the axial direction with respect to the permanent magnets of the input and output rotors.

* * * * *